United States Patent
Yasuda

(10) Patent No.: US 7,508,992 B2
(45) Date of Patent: Mar. 24, 2009

(54) IMAGE-PROCESSING APPARATUS FOR COMPRESSING BINARY-FORMAT IMAGE DATA

(75) Inventor: Naohiro Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 858 days.

(21) Appl. No.: 10/940,336

(22) Filed: Sep. 14, 2004

(65) Prior Publication Data

US 2005/0084170 A1    Apr. 21, 2005

(30) Foreign Application Priority Data

Sep. 19, 2003    (JP)    ............................. 2003-328523

(51) Int. Cl.
*G06K 9/36* (2006.01)
*G06K 9/46* (2006.01)

(52) U.S. Cl. ................... 382/245; 382/235; 382/298; 382/299

(58) Field of Classification Search ................ 382/235, 382/245, 298, 299; 358/426.13
See application file for complete search history.

(56) References Cited

U.S. PATENT DOCUMENTS

| 4,628,534 | A | | 12/1986 | Marshall | |
|---|---|---|---|---|---|
| 5,729,635 | A | * | 3/1998 | Fast et al. | ..................... 382/254 |
| 5,867,612 | A | * | 2/1999 | Robson | ..................... 382/298 |
| 2002/0089707 | A1 | | 7/2002 | Yasuda | |
| 2003/0156302 | A1 | | 8/2003 | Yasuda | |

FOREIGN PATENT DOCUMENTS

| EP | 0552544 A1 | 7/1993 |
|---|---|---|
| JP | 5-250468 | 9/1993 |
| JP | 10-341335 | 12/1998 |

* cited by examiner

*Primary Examiner*—Phuoc Tran
(74) *Attorney, Agent, or Firm*—Cooper & Dunham, LLP.

(57) ABSTRACT

An apparatus for image processing is disclosed. The apparatus is for reducing one or more runlengths by converting binary-format image data for each of black and white runlengths in one direction relative to the data so as to obtain the reduced image data relative to that direction. In the apparatus, when performing an operation of reducing a given one of the runlengths, the operation is performed with reference to one or more runlengths, other than the given runlength, of the same line that have already been reduced.

6 Claims, 5 Drawing Sheets

FIG.5 x=1, y=2 (50% REDUCTION)

| m | BW | L | D | L(m)*x + MOD(m−1) | NL' | MOD' | NL | MOD |
|---|----|---|---|-------------------|-----|------|----|----|
| 1  | 1 | 3 | 0 | 3*1 + 0 = 3     | 1 | 1 | 1 | 1 |
| 2  | 0 | 2 | 1 | 2*1 + 1 = 3     | 1 | 1 | 1 | 1 |
| 3  | 1 | 4 | 0 | 4*1 + 1 = 5     | 2 | 1 | 2 | 1 |
| 4  | 0 | 1 | 1 | 1*1 + 1 = 2     | 1 | 0 | 1 | 0 |
| 5  | 1 | 1 | 0 | 1*1 + 0 = 1     | 0 | 1 | 1 | −1 |
| 6  | 0 | 1 | 1 | 1*1 + (−1) = 0  | 0 | 0 | 0 | 0 |
| 7  | 1 | 1 | 1 | 1*1 + 0 = 1     | 1 | 1 | 0 | 1 |
| 8  | 0 | 1 | 1 | 1*1 + 1 = 2     | 0 | 0 | 1 | 0 |
| 9  | 1 | 1 | 0 | 1*1 + 0 = 1     | 1 | 1 | 1 | −1 |
| 10 | 0 | 1 | 1 | 1*1 + (−1) = 0  | 0 | 0 | 0 | 0 |
| 11 | 1 | 1 | 1 | 1*1 + 0 = 1     | 0 | 1 | 0 | 1 |

IMAGE-PROCESSING APPARATUS FOR COMPRESSING BINARY-FORMAT IMAGE DATA

TECHNICAL FIELD

This disclosure generally relates to a technology that can be used for image processing in a facsimile machine or a copying machine and, more particularly, to an image-processing apparatus for compressing binary-format image data, such as in the facsimile machine or the copying machine.

BACKGROUND ART

Performing a scaling process on data for a binary-format image represented by a facsimile image systematically on a pixel-by-pixel basis depending on a scaling factor causes various inconveniences. More specifically, the inconveniences are pronounced when reducing the data such that performing a thinning-out process on the data systematically in a simple manner may cause a dropout in the image with respect to a fine line, etc., such as a ruled line, a line within a character, and an underline, etc. Thus, the process may cause dropout of the character and difficulty in identifying the character, and loss of the ruled line or the underline. Therefore, various measures have been proposed up to now, especially on a method of reducing.

Patent Document 1
JP5-250468A
Patent Document 2
JP10-341335A

In the invention as described in the Patent Document 1, providing means for converting one pixel of an original image into one pixel of a reduced image when the integer part of the outcome of a multiplication is zero, and means for, when the negative value of the decimal part obtained by converting into the one pixel of the reduced image exceeds a predetermined value, not converting the one pixel of the original image into the reduced image, aims to reduce to the minimum level a crushing or a deformation in reducing an original image such that alternating black and white appears. However, this method is considered to be insufficient, as the original image is limited to a runlength of one pixel, and also from the point of view of keeping a black runlength which is generally an important information item in a binary format image.

Moreover, in the invention as described in the Patent Document 2, a method is proposed such that image data corresponding to one line for one direction are multiplied by a scaling factor per runlength so as to obtain scaled runlengths, and the decimal part of each of the scaled runlengths is truncated in the ascending order of the magnitude of the decimal part as described above in order to match the number of dots in one line after scaling so as to produce a scaled image, at which time as an exceptional process, the truncating as described above is postponed when the integer part of the scaled runlength is zero; and when even such postponing does not result in a sufficient reducing, the decimal part as described above is eliminated from a white dot.

According to this method, while an occurrence of a runlength (with the integer part of zero) disappearing by reducing may be avoided, final reduced-image data cannot be produced until a runlength-reducing operation for the whole one line has been completed. A buffer memory having a capacity corresponding to one line is required for collating the integer part and the decimal part of each runlength so as to store the collated parts. This may become not only an obstacle when trying to implement a scaling process with a small amount of memory resources, but, also when the process itself is implemented in software by means of a CPU, a burden on the CPU. Thus, in a method of operation for reducing, per runlength, binary format image data corresponding to one line, enabling real-time computing of reduced data with a relatively simple sequential process, and enabling keeping of important information on the image by not causing a loss of a small black runlength, are preferable.

SUMMARY

In an aspect of this disclosure, an apparatus for image processing for compressing binary-format image data is provided in a facsimile machine or a copying machine that enables obtaining a good reduced image with a small amount of pixel dropout.

In another aspect of this disclosure in an apparatus for image processing for reducing one or more runlengths by converting binary-format image data for each of black and white runlengths in one direction relative to the data so as to obtain the reduced image data relative to that direction, when performing an operation of the reducing on a given one of the runlengths, the operation of the reducing is performed with reference to one or more runlengths, other than the given runlength, of the same line that have already been administered the operation of the reducing.

In another aspect of this disclosure, an apparatus for image processing is provided enables obtaining a good reduced image with a small amount of pixel dropout.

BRIEF DESCRIPTION OF THE DRAWINGS

Other aspects, features, and advantages will become more apparent from the following detailed description when read in conjunction with the accompanying drawings, in which:

FIG. 5 is a table illustrating an outcome of operation in FIG. 4.

BEST MODE FOR CARRYING OUT THE INVENTION

Descriptions are given next, with reference to the accompanying drawings, of a preferred embodiment of the present invention.

Figure 1:
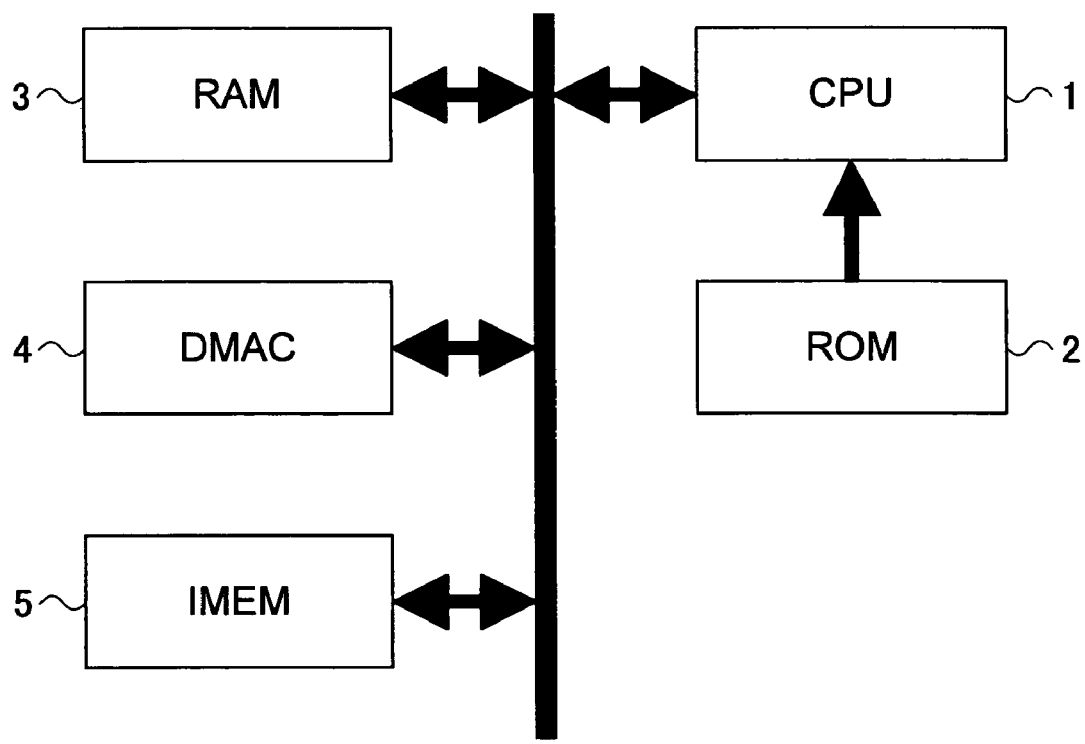
FIG. 1 is a block diagram illustrating an example configuration of an image processing system for reducing binary-format image data according to an embodiment of the present invention.

FIG. 1 is a diagram illustrating an example configuration of an image processing system for reducing binary-format image data according to an embodiment of the present invention. This image processing system includes a CPU (Central Processing Unit) 1, a ROM (Read Only Memory) 2, a RAM (Random Access Memory) 3, a DMAC (Direct Memory Access Controller) 4, and an IMEM 5.

The CPU 1 controls the overall system and performs an operation of reducing the image data, procedures for reducing to be performed according to programs being stored in the ROM 2. The RAM 3 is a Random Access Memory for securing a work area required for processing the image data. The DMAC (Direct Memory Access Controller) 4 is a DMA controller dedicated for controlling transfer of the image data within the system, while the IMEM 5 is a large-capacity memory for storing the image data. It is assumed that this IMEM 5 has stored binary format image data corresponding to at least one page and that, for a reducing process, the image data are transferred to the RAM 3 on a line-by-line basis, the reducing process is performed per runlength on the RAM 3, and reduced data corresponding to one line are produced and again transferred back to the IMEM 5.

Repeating this process over the number of lines corresponding to one page completes a process of reducing the image data corresponding to one page. It is to be noted that, while an image-data flow as described above illustrates an example operation of a system to which an embodiment of the present invention is applied, it is possible to implement the present invention with a method other than this method. For example, a procedure such that, image data are transferred from the IMEM 5 to the RAM 3 per runlength and a reducing process is performed on the image data to form on the RAM 3 reduced-image data corresponding to one line, is possible.

Moreover, while a software method by means of the CPU 1 is assumed to be an example as other means of implementing, the means of implementing is not limited to such a case. In other words, a method of reducing may be configured in hardware.

Next, a procedure for processing the present embodiment is described with reference to a flowchart in FIG. 2.

First, letters used herein are described: m is a number identifying a runlength, 0 being a fictitious runlength for specifying the initial state. As a method of reducing according to the present embodiment, the same process is performed for both white and black runlengths, with m incremented by 1, the logic (whether white or black) of the runlengths is switched. BW(m) denotes the logic of the mth runlength, herein specifying 1 for black and 0 for white. Even when this definition of the logic is reversed, implementing the present embodiment is enabled.

In this flowchart, the logic of the first runlength is assumed to be black. There is no impact on the method itself even if the logic of the $1^{st}$ runlength is assumed to be white. D(m) denotes the logic of the runlength neighboring after reducing, relative to the mth runlength, specifying 1 for black and 0 for white as in the BW(m). Whether the logic of D(m) is made the same as that of BW(m) has no impact on the method itself.

It is assumed that the neighboring runlength has already completed a process of reducing, the runlength at or before the (m−1)th being the target for the mth runlength. While D(m) becomes BW(m−1) when the (m−1)th reduced runlength is not zero, when the (m−1)th reduced runlength is zero, D(m) assumes the logic of the runlength at or before the (m−2)th.

NL(m) denotes a reduced runlength, and NL'(m) is a provisional runlength for determining NL(m). MOD(m) is a remainder (an integer) obtained when computing NL(m). A reduction ratio is denoted by x/y (x, y being positive integers with x<y), and MOD(m) is always smaller than the value of y, representing that MOD(m) is a fraction less than one pixel after reduction.

This flowchart illustrates a process of reducing corresponding to one line. First, the initial state is set (Step 1). The reduction rate, denoted x/y, may be x=1, y=2 when it is 50%, for example. D(1)=0 denotes the logic of a neighboring runlength when a first runlength is reduced, the initial state assumed to be white. Although this does not become a constraint, it is assumed to be white as generally an area outside an effective image area is most often handled as white.

MOD(0) is set to be 0 for being a remainder obtained by an operation of reducing a fictitious runlength. An operation of reducing is performed for an actual runlength with such initial state. A first runlength process is started with m being incremented (Step 2). The provisional runlength NL'(m) is computed based on Equation (1) (Step 3):

$$NL'(m)=int[\{L(m)*x+MOD(m-1)\}/y] \quad (1)$$

In this Equation (1), "int" is a process of integerizing by means of truncating the remainder. L(m) is the mth runlength value.

Next, the provisional remainder MOD'(m) is computed based on Equation (2):

$$MOD'(m)=mod[\{L(m)*x+MOD(m-1)\}/y] \quad (2)$$

In this Equation (2), "mod" is a process of computing the remainder.

Once NL'(m) is computed, whether the value is 0 is determined (Step 4). When NL'(m) is not zero (Y in Step 4), the provisional values NL'(m) and MOD'(m) become respectively the determined values NL(m) and MOD(m) (Step 5). At the same time, it is set that D(m+1)=BW(m) (Step 6).

On the other hand, when NL'(m) is zero (N in Step 4), whether BW(m)=1 and D(m)=0 is determined (Step 7).

Figure 3:
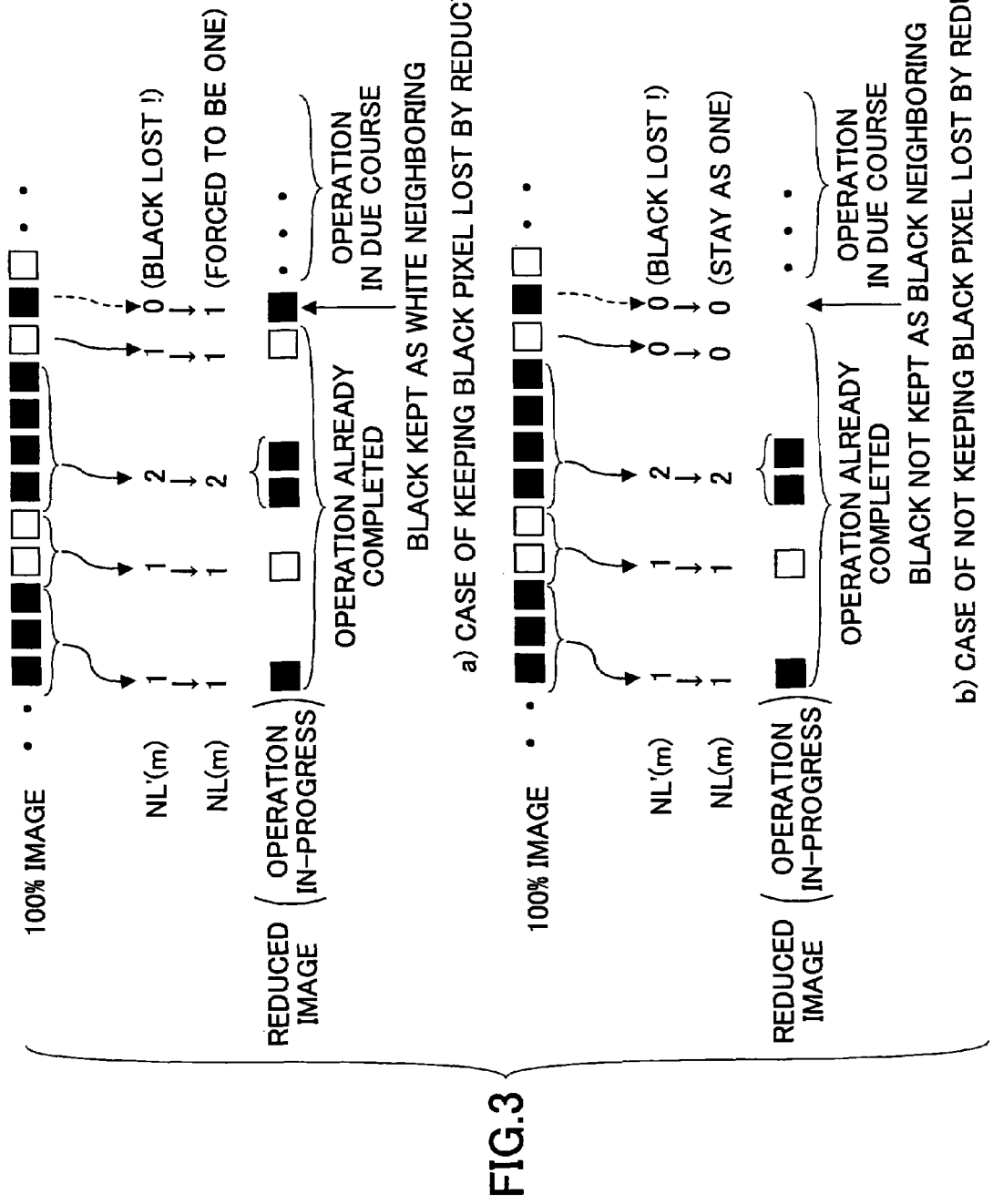
FIG. 3 is a schematic diagram for describing conditions for keeping a black pixel lost.

Herein, this physical significance is discussed. BW(m)=1 represents that the logic of the runlength with an operation of reducing in-progress now is black, while BW(m)=0 represents that the logic of a runlength neighboring the runlength after the reducing is white. In other words, for a black-pixel sequence whose runlength ends up becoming zero with an operation of reducing, conditions are indicated for extracting one pixel that was to be a change point after reducing (refer to FIG. 3).

When this condition is fulfilled (Y in Step 7), the determined value NL(m) is set to be one, and MOD(m) is set equal to y subtracted from the provisional value MOD'(m) (Step 8). This pair of Step 7 and Step 8 is a feature of the present embodiment.

Then, D(m+1) in the same manner as described above is set equal to BW(m) (Step 6). On the other hand, as a result of determining whether BW(m)=1 and D(m)=0, when this condition is not fulfilled (N in Step 7), the provisional values NL'(m) and MOD'(m) respectively are assigned as the determined values NL(m) and MOD(m) (Step 9). However, as for D (m+1), D(m) is substituted as it is (Step 10). This represents that the logic of the runlength neighboring relative to the next runlength does not change as the runlength is lost.

Repeating the process as described above over the runlengths corresponding to one line completes a process of reducing one line.

Next, an example of performing a reduction according to this process is described.

Figure 4:
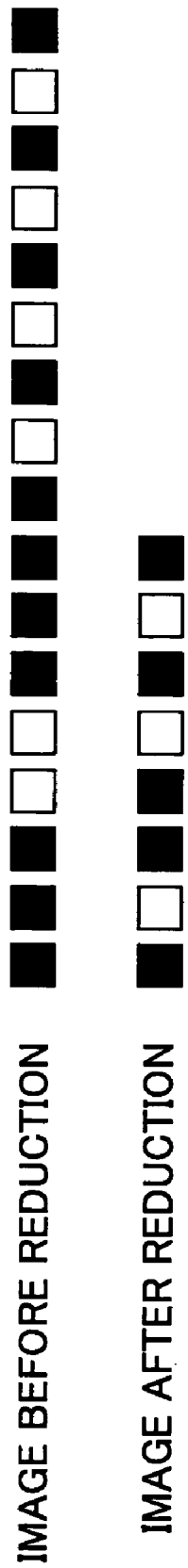
FIG. 4 illustrates a pixel sequence having administered a reduction by means of a method of reducing according to the embodiment of the present invention.

FIG. 4 illustrates a pixel sequence having a reduction by means of a method of reducing according to the embodiment of the present invention, with stages of its operation illustrated in a table in FIG. 5. NL'(m)≠0 for the runlength of m=1 through 4 and the results of determination in Step 4 in the flowchart in FIG. 2 are all "Y".

Figure 2:
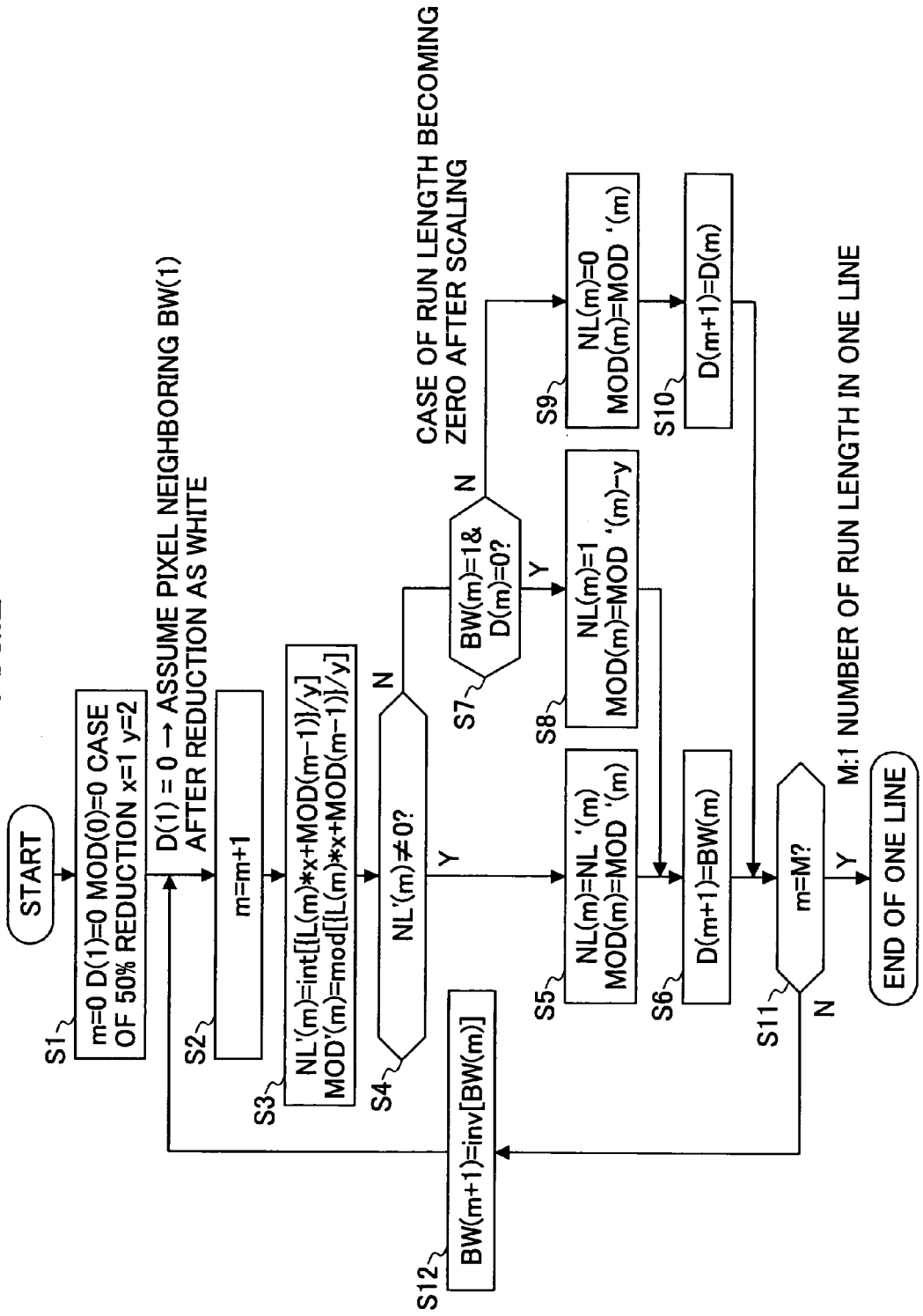
FIG. 2 is a flowchart illustrating a process according to the embodiment of the present invention.

When performing an operation of the runlength with m=5, NL'(m)=0, the determination of step 4 in FIG. 2 becomes "N". At that time, with BW(m)=1 and D(m)=0, Step 7 becomes "Y". Therefore, NL(m) is forced to be equal to 1, and with performing the operation MOD(m)=MOD'(m)−y, the result is MOD(m)=−1.

In the runlength with m=6, also with NL'(m)=0, as BW(m)=0 and D(m)=1, Step 7 yields "No". In that case, NL(m) and MOD(m) are respectively substituted with the values of NL'(m) and MOD'(m) as they are.

With m=7, in the same manner as NL'(m)=0, as BW(m)=1 and D(m)=1, it will undergo the same process as with m=6.

Below, with m=9, the same process as that with m=5 is performed, resulting in keeping the black pixel.

As the value of NL(m) in FIG. 5 becomes the runlength after the reduction, the result is such as the image after reduction as illustrated in FIG. 4.

The present application is based on the Japanese Priority Application No. 2003-328523 filed on Sep. 19, 2003, the entire contents of which are hereby incorporated by reference.

The invention claimed is:

1. An apparatus for image processing, said apparatus comprising:
a storage part configured to store image data; and
a processing part configured to retrieve the image data from the storage part and perform operation of reducing one or more runlengths by converting binary-format image data for each of black and white runlengths in one direction relative to the data so as to obtain the reduced image data relative to that direction,
wherein, when performing the operation of the reducing on a given one of the runlengths, the operation of the reducing is performed with reference to one or more runlengths other than the given runlength of the same line that have already been reduced,
wherein, when performing the operation of the reducing on the given runlength, the operation of the reducing is administered with reference to, out of the other runlengths of the same line that have already been reduced, a runlength neighboring after the reducing, and
wherein, when an outcome of the operation on a given runlength A is zero, out of the other runlengths of the same line that have already been reduced, when the logic level of a runlength B neighboring after the reducing is the logic level in reverse of the logic level of the runlength A, the outcome of the operation on said runlength A is forced to be one, whereas, when the logic level of the runlength B is the same as the logic level of the runlength A, the outcome is kept to zero as it is.

2. The apparatus of claim 1, further comprising:
a work area memory; and
a data controller part configured to control transfer of the binary-format image data from the storage part to the work area memory,
wherein the processing part performs the reduction per runlength and the reduced image data corresponding to one line is returned to the storage part.

3. The apparatus of claim 2, wherein the storage part stores the binary-format image data corresponding to at least one page, the binary-format image data is transferred to the work area memory on a line-by-line basis, and the processing part performs the reduction over the number of lines corresponding to the at least one page.

4. An apparatus for image processing, said apparatus comprising:
a storage part configured to store image data; and
a processing part configured to perform operation of reducing one or more runlengths by converting binary-format image data for each of black and white runlengths in one direction relative to the data so as to obtain the reduced image data relative to that direction,
wherein, when performing the operation of the reducing on a given one of the runlengths, the operation of the reducing is performed with reference to one or more runlengths other than the given runlength of the same line that have already been reduced,
wherein, when performing the operation of the reducing on the given runlength, the operation of the reducing is administered with reference to, out of the other runlengths of the same line that have already been reduced, a runlength neighboring after the reducing, and
wherein, when the logic level of a given runlength A corresponds to a black pixel and an outcome of the operation is zero out of the other runlengths of the same line that have already been reduced, when the logic level of a runlength B neighboring after the reducing corresponds to a white pixel, the outcome of the operation on said runlength A is forced to be one, whereas, when the logic level of the runlength B corresponds to the black pixel as the logic level of the runlength A. the outcome is kept to zero as it is.

5. The apparatus of claim 4, further comprising:
a work area memory, and
a data controller part configured to control transfer of the binary-format image data from the storage part to the work area memory,
wherein the processing part performs the reduction per runlength and the reduced image data corresponding to one line is returned to the storage part.

6. The apparatus of claim 5, wherein the storage part stores the binary-format image data corresponding to at least one page, the binary-format image data is transferred to the work area memory on a line-by-line basis, and the processing part performs the reduction over the number of lines corresponding to the at least one page.

* * * * *